United States Patent [19]

Gras et al.

[11] Patent Number: 5,173,560
[45] Date of Patent: Dec. 22, 1992

[54] COLD-CURING SOLVENT FREE, DUROPLASTIC POLYURETHANE-POLYUREA COMPOUNDS

[75] Inventors: Rainer Gras, Bochum; Elmar Wolf, Recklinghausen, both of Fed. Rep. of Germany

[73] Assignee: Huels Aktiengesellschaft, Marl, Fed. Rep. of Germany

[21] Appl. No.: 732,235

[22] Filed: Jul. 18, 1991

[30] Foreign Application Priority Data

Sep. 6, 1990 [DE] Fed. Rep. of Germany ....... 4028288

[51] Int. Cl.$^5$ ............................................. C08G 18/80
[52] U.S. Cl. .................................. 528/45; 427/385.5; 428/423.1
[58] Field of Search ....................... 528/45; 427/385.5; 428/423.1

[56] References Cited

U.S. PATENT DOCUMENTS 4,243,792  1/1981  Short ...................................... 528/45

FOREIGN PATENT DOCUMENTS 0096210  12/1983  European Pat. Off. .
2364935   4/1978  France .

Primary Examiner—Maurice J. Welsh
Attorney, Agent, or Firm—Oblon, Spivak, McClelland, Maier & Neustadt

[57] ABSTRACT

Cold-curing, solvent-free, duroplastic two- and one-component polyurethane-polyurea compounds, comprising
 a) a (cyclo)aliphatic polyisocyanate, with NCO groups blocked with specific, sterically-hindered piperidine derivative,
 b) a primary and/or secondary di- and/or polyamine, where —in the case of one-component systems—the primary amino groups are present in blocked form as ketimines and
 c) polyester- and/or polyether polyols are useful for coating, sealing and encapsulating compounds.

15 Claims, No Drawings

COLD-CURING SOLVENT FREE, DUROPLASTIC POLYURETHANE-POLYUREA COMPOUNDS

BACKGROUND OF THE INVENTION

1. Field of the Invention

The present invention relates to cold-curing, solvent-free, duroplastic two- and one-component polyurethane-polyurea compounds (hereinafter abbreviated as PUR/PU), comprising primary and/or secondary di- and/or polyamines, where optionally the primary amino groups can be present in blocked form, e.g., as ketimines, and polyisocyanates, whose free NCO groups are blocked with specific piperidine derivatives, for coatings, sealing and encapsulating compounds.

2. Discussion of the Background

It is known that polyamines react so fast with polyisocyanates that they cannot be processed, when duroplastic PUR/PU compounds are formed. In contrast, diamines can be processed with polyisocyanates into thermoplastic PUR/PU compounds either in solution or in the melt. In the case of the latter PUR/PU systems that can be processed like a thermoplastic, the properties of the PUR/PU elastomers are improved by introducing urea segments.

Thus, it is not possible to prepare cross-linked PUR/PU systems, e.g., by reacting a diamine with a triisocyanate or vice versa by reacting a tri- or higher functional amine with a diisocyanate. In the DE-OS 10 86 372, coating agents or catalyzed lacquers are disclosed. They are prepared at room temperature by reacting a phenol-blocked aromatic diisocyanate and an amide group-containing amine.

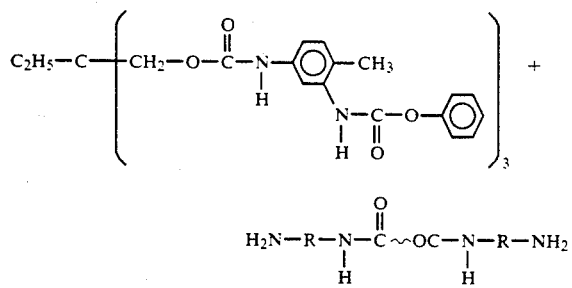

R: alkylene group

A prerequisite for this reaction—reduction of the NCO reactivity with respect to the $NH_2$ groups by blocking the NCO groups—is that the blocking agent is bonded only so strongly that it can be displaced by the amino group at room temperature, as is the case, of course, for the phenol-blocked aromatic NCO groups. At the 1980 Fatipec Convention (*FatipecKonoressbuch* II, pp. 293–306), flexible, cross-linked two-component PUR elastomer systems were presented that were prepared according to the same principle - reduction of the NCO reactivity through blocking. These cross-linked 2-component-PUR elastomers are a polymeric network, which is obtained by reacting a nonyl phenol-blocked isocyanate adduct comprising 1 mole of polypropylene ether triol (molecular weight: approximately 3,000) and 3 mole of toluylene-diisocyanate (TDI) with a diamine, e.g., LAROMIN ® C 260 of BASF (3,3'-dimethyl-4,4'-diaminedicyclohexyl-methane) at room temperature in a $NCO:NH_2$ ratio of 1:1.

Both of the above-described PUR systems cross-linked by a $NCO/NH_2$ reaction have the drawback that they are not light resistant, since they utilize aromatic polyurethanes, which tend, as is well-known, to discolor during weathering.

It is not possible to eliminate this drawback of the aromatic PUR systems through simple substitution of the aromatic diisocyanate with a (cyclo)aliphatic one (aliphatic polyurethanes exhibit, as is well-known, excellent light resistance and weathering resistance), since phenol-blocked (cyclo)aliphatically bonded NCO groups do not react with amino groups at room temperatures, i.e., the deblocking of these NCO groups by the amino groups does not take place.

SUMMARY OF THE INVENTION

Accordingly, one object of the present invention is to provide novel cold-curing, solvent-free, duroplastic two- and one-component PUR/PU elastomers, based on blocked (cyclo)aliphatic polyisocyanates and primary and/o secondary di- and/or polyamines, where optionally the primary amino groups can be present in blocked form as ketimines.

It is another object of the present invention to provide novel cold-curing, solvent-free, duroplastic two- and one-component PUR/PU elastomers, which are characterized by light and weathering resistance.

It is another object of the present invention to provide a method of coating, sealing, or encapsulating a substrate with such an elastomer.

It is another object of the present invention to provide articles which comprise a substrate which has been coated, sealed, or encapsulated with such an elastomer.

These and other objects, which will become apparent during the following detailed description have been achieved by the inventors' discovery that when the NCO groups of the (cyclo)aliphatic polyisocyanate are blocked with specific piperidine derivatives, the $NCO/NH_2$ reaction is controllable.

DETAILED DESCRIPTION OF THE PREFERRED EMBODIMENTS

Thus, one aspect of the present invention relates to cold-curing, solvent-free, duroplastic two- and one-component polyurethane polyurea compounds, comprising:

(a) a (cyclo)aliphatic polyisocyanate, in which NCO groups are blocked with a piperidine derivative of the following formula:

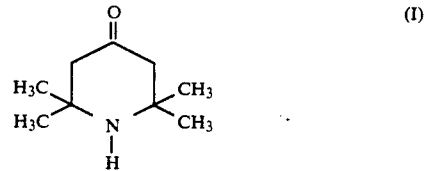
(I)

or

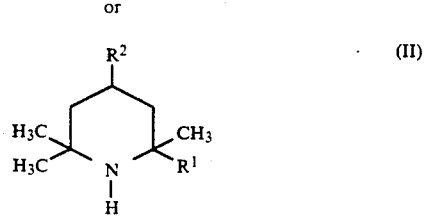
(II)

wherein:
$R^1 = H, CH_3$

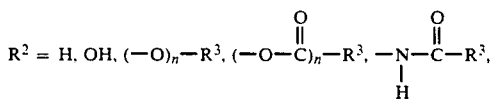

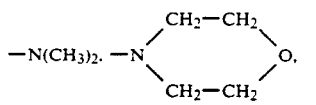

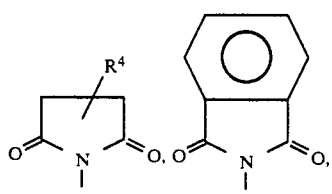

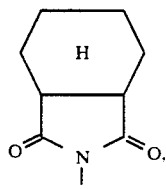

n = 1 or 2
$R^3$ = a $C_{1-18}$, preferably $C_{1-4}$, alkyl group, if n = 1 and
$R^3$ = a $C_{2-18}$, preferably $C_{2-4}$, alkylene group, if n = 2
$R^4$ = H, or a $C_{1-20}$, preferably $C_{1-4}$, alkyl group, and (b) a primary and/secondary di-and/or polyamine, where—in the case of a one-component system—the primary amino groups are present in a blocked form as ketimines and (c) a polyester polyol and/or polyether polyol.

The ether- and ester bonds according to formula (II) can also be added in bifunctional form such as bis-(2,2,6,6-tetramethyl-4-piperidyl)-sebacate.

For the PUR/PU compounds of the invention, reaction products comprising linear and/or branched polyether- and/or polyester polyols and (cyclo)aliphatic dissocyanates are suitable, where the OH/NCO ratio can be 1:1 to 1:1.2, preferably 1:1 and the free NCO groups of the diisocyanate prepolymers are blocked with piperidine derivatives. Suitable linear or branched polyether polyols are the polyalkylene-polyether-polyols with an average molecular weight ranging from 200 to 7,000, as obtained through copolymerization, block polymerization or anionic polymerization of alkylene oxides, such as in particular ethylene and/or propylene oxide with di- and polyfunctional alcohol, such as ethylene glycol, 1,3-propanediol, butanediol, trimethylolpropane or amines, such as ethylenediamine or hexamethylenediamine as starting components or cationic polymerization and copolymerization of cyclic ethers, such as tetrahydrofuran, ethylene- and propylene oxide with acidic catalysts.

Polyester polyols are also suitable. They represent reaction products of polyvalent alcohols with polyvalent carboxylic acids. Instead of free polycarboxylic acids, the appropriate anhydrides or carboxylates of low alcohols or their mixtures can also be used. The polycarboxylic acids can be of an aliphatic, cycloaliphatic, aromatic and/or heterocyclic nature and, optionally, e.g., be substituted with halide atoms. Examples of suitable polycarboxylic acids or polycarboxylic acid derivatives are succinic acid, adipic acid, sebacic acid, phthalic acid, and isophthalic acid, phthalic acid anhydride, hexahydrophthalic acid anhydride, tetrahydrophthalic acid anhydride and tetrachlorophthalic acid anhydride, dimeric fatty acids and terephthalic acid dimethyl ester.

Suitable polyvalent alcohols are, e.g., ethylene glycol, 1,2- and 1,3- propylene glycol, butanediol, 1,6-hexanediol, 1,8-octanediol, neopentyl glycol, 2,2,4(2,4,4)-trimethyl-1,6-hexanediol, cyclohexane-1,4-dimethanol, 3-methyl-1,5-pentanediol, glycerol, trimethylolpropane, trimethylolethane, 1,2,6-hexanetriol, diethylene glycol, triethylene glycol, tetraethylene glycol, dipropylene glycol or dibutylene glycol.

Lactones, e.g., ε-caprolactone or hydroxycarboxylic acids, e.g., hydroxycapronic acid can also serve as the raw material component to prepare the polyester.

Suitable (cyclo)aliphatic diisocyanates are: hexamethylene-1,6-diisocyanate (HDI), 2-methyl-pentamethylene-1,5-diisocyanate, 2,2,4(2,4,4)-trimethyl-hexamethylene-1,6-diisocyanate (TMDI), isophorone diisocyanate (IPDI), methylene-bis-(4-cyclohexyl isocyanate), tetramethyl-xylylene-diisocyanate, 1,4-bis-(isocyanatomethyl)-cyclohexane.

Naturally, the dimeric and trimeric forms of the polyisocyanate, like uretediones or ureas and isocyanurates or biurets, which are prepared according to known methods, are also suitable in the context of the present invention.

Of course, the aforementioned compounds can also be added in a mixture with the monomeric diisocyanates, as defined by the invention.

The terminal NCO groups of the bi- or polyfunctional compounds are subsequently converted in such a manner with the piperidine derivatives (I) and (II) at 50° to 100° C. that preferably about one mole of piperidine compound per NCO equivalent is made to react.

Of the piperidine derivatives added according to the present invention preferably 2,2,6,6-tetramethyl-4-dimethylamino-piperidine, 2,2,6,6-tetramethyl-4-oxo-piperidine (TAA) and the bifunctional piperidine derivative, bis-(2,2,6,6-tetramethyl-4-piperidyl)sebacate are used.

It is to be understood that when $R^2$ is $(-O)_2-R^3$ and $R^3$ is an alkylene group, the two oxygen atoms are singly bonded to the carbon atom bearing $R^2$, and $R^3$ forms an alkylene bridge between the two oxygen atoms. Similarly, when $R^2$ is

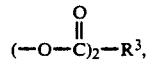

$R^3$ forms an alkylene bridge between the two carbonyl carbon atoms.

The preparation of the NCO group-containing polyisocyanates and also their blocking can be performed in substance (neat) or in suitable plasticizers and flame retardants that are inert with respect to the NCO groups and typical in PUR chemistry.

Suitable plasticizers or flame retardants are dicarboxylates, e.g., benzyl butyl phthalate, phosphates, e.g., trioctyl phosphate, tricresyl phosphate, phosphorus chloride ester, e.g., trichloroethylene phosphate, sulfonate or chlorinated paraffins.

The di- and/or polyamines that can be added according to the present invention are well-known organic compounds with at least two primary amino groups, linked preferably with primary and/or secondary carbon atoms, and optionally other secondary amino groups.

They are preferably (cyclo)aliphatic primary and/or secondary di- and/or polyamines. According to the invention, araliphatic diamines can also be regarded as aliphatic diamines. The di- and/or polyamines to be used according to the invention exhibit a molecular weight ranging from 60 to 500, preferably 100 to 300.

Examples of suitable primary and/or secondary di- and/or polyamines are: ethylenediamine, propylenediamine, butylenediamine, 2,2,4,(2,4,4)-trimethylhexamethylene-1,6-diamine (TMD), 2-methyl-pentamethylene-1,5-diamine (DA51), 1,4-diaminocyclohexane 1,4-bis-(aminomethyl)-cyclohexane, isophorone diamine (IPD), methylene-bis-(4-cyclohexylamine) (HMDA) and 3,3'-dimethyl-4,4'-diaminodicyclohexyl-methane and diethylene triamine (DETA), triethylene tetramine (TETA), tetraethylene pentamine (TEPA), pentaethylene hexamine (PEHA) and dipropylene triamine.

According to the present invention, the primary amino groups of the aforementioned di- and/or polyamines can be added in their blocked form as ketimines, which are prepared, according to known methods, through condensation with ketones, e.g., acetone, methyl ethyl ketone, methyl isobutyl ketone (MIBK), diisobutyl ketone, and cyclohexanone.

According to the present invention, storage-stable one-component PUR/PU compounds can now be synthesized due to the blocking of the NCO groups with the piperidine derivatives in combination with the blocked diamines, without the known competitive reactions between isocyanate and ketimine groups being possible. These one component systems also cure at room temperature by first hydrolyzing the ketimine with atmospheric humidity, water, and the released primary amino groups cause subsequently the cross-linking by deblocking the NCO groups.

The blocked NCO groups are mixed with the amino groups, also in blocked form, in a NCO/NH ratio of 0.8 to 1.4, preferably 0.9 to 1.1 and in particular in a stoichiometric ratio.

The two- and one-component PUR/PU compounds of the invention are useful to prepare cold-curing coatings, sealing, and encapsulating compounds. The auxiliary substances and additives required for the respective application like fillers, pigments, catalysts, defoamers can be admixed, where in the case of one-component systems it must be observed that the mixture is anhydrous.

As substrate for the PUR/PU compounds of the present invention, any substrate like concrete, metal, wood, glass, ceramic, stone and plastics is suitable. The application is conducted by known method through knife application, casting, injecting, rolling.

Having generally described this invention, a further understanding can be obtained by reference to certain specific examples which are provided herein for purposes of illustration only and are not intended to be limiting unless otherwise specified.

EXAMPLES

The following examples demonstrate the PUR/PU compounds of the invention. The percentages relate to the percent by weight; the data in parts to parts by weight.

Preparation of polyurethane-polyurea compounds of the invention

A Two-component systems

Example 1

2,000 parts by weight of a linear polyoxypropylene glycol having an OH number of 56 mg of KOH/g were heated with 444 parts by weight of IPDI at 80° C. until the NCO content of the reaction mixture was at approximately 3.4 wt. %. Subsequently, 282 parts by weight of 2,2,4,6-tetramethyl piperidine were added in portions to the reaction mixture while stirring intensively and further heated at 80° C. until the NCO content of the mixture had dropped to approximately 0.2 wt. %. The viscosity of the reaction product was 54,000 mPa·s at 25° C.

The blocked IPDI prepolymer is homogenized with the equivalent quantity of polyamine and optionally with 0.05–0.1 wt. % of a defoamer and subsequently, if necessary, extensively degassed until free of bubbles. The casting compound is poured into molds and cured at room temperature.

|  | Example | | | |
|---|---|---|---|---|
|  | 1.1 | 1.2 | 1.3 | 1.4 |
| polyamine | DETA | TETA | TEPA | PEHA |
| pot life in hours | 2–3 | 2–3 | 2–3 | 2.5–3 |
| Shore A after |  |  |  |  |
| 1 day | 8 | 15 | 30 | 39 |
| 3 days | 12 | 19 | 36 | 44 |
| 7 days | 16 | 25 | 39 | 47 |

The abbreviations in the tables mean:
Shore A: hardness testing according to DIN 53 505
DISFLAMOLL ® TKP = tricresyl phosphate
MESAMOLL ® = alkyl sulfonate of phenol
DISFLAMOLL ®TOF = trioctyl phosphate

Example 2

2,000 parts by weight of a linear polyoxypropylene glycol having an OH number of 56 mg of KOH/g were heated with 444 parts by weight of IPDI at 80° C. until the NCO content had reached 3.4 wt. %. Subsequently, 310 parts by weight of TAA were added in portions while stirring intensively and further heated for approximately 4 hours. The reaction product had, at 25° C., a viscosity of 8,100 mPa·s and a free NCO content of approximately 0.2 wt. %.

According to Example 1, the blocked IPDI prepolymer was reacted with the equivalent quantity of polyamine and cured at room temperature.

|  | Example | | | | |
|---|---|---|---|---|---|
|  | 2.1 | 2.2 | 2.3 | 2.4 | 2.5 |
| polyamine | DETA | TETA | TEPA | PEHA | PEHA/IPD/ 1:1 |
| pot life in hours | 1.5–2.5 | 1.5–2.5 | 1–2 | 1.5–2.5 | 2–3 |
| Shore A after |  |  |  |  |  |
| 1 day | 10 | 14 | 32 | 37 | 42 |
| 3 days | 14 | 19 | 39 | 44 | 47 |
| 7 days | 19 | 27 | 41 | 49 | 55 |

Example 3

3,000 parts by weight of a branched polyoxypropylene glycol having an OH number of 56 mg of KOH/g were made to react with 666 parts by weight of IPDI, according to Example 1. Subsequently, the NCO groups were blocked with 423 parts by weight of 2,2,4,6-tetramethyl piperidine. The reaction product had, at 25° C., a viscosity of 35,000 mPa·s.

According to Example 1 the blocked prepolymer was reacted with the equivalent quantity of polyamine and cured at room temperature.

|  | Example | | | | | | |
|---|---|---|---|---|---|---|---|
|  | 3.1 | 3.2 | 3.3 | 3.4 | 3.5 | 3.6 | 3.7 |
| polyamine | DETA | TETA | TEPA | PEHA | IPD | HMDA | TETA/HMDA 1:1 |
| pot life in hours | 1.5–2.5 | 1.5–2 | 1.5–2 | 1.5–2 | 0.5–1 | 0.5–1 | 1–1.5 |
| Shore A after | | | | | | | |
| 1 day | 10 | 19 | 32 | 36 | 28 | 30 | 34 |
| 3 days | 12 | 24 | 35 | 40 | 34 | 38 | 43 |
| 7 days | 14 | 28 | 37 | 45 | 39 | 43 | 46 |

Example 4

3,666 parts by weight of the NCO prepolymer from Example 3 were reacted, according to Example 2 with 465 parts by weight of TAA at 80° C. The viscosity of the reaction product was, at 25° C., 9,600 mPa·s; the free NCO content was 0.2 wt. %.

According to Example 1 the blocked prepolymer was reacted in the equivalent ratio with polyamine and cured at room temperature.

|  | Example | | | | | |
|---|---|---|---|---|---|---|
|  | 4.1 | 4.2 | 4.3 | 4.4 | 4.5 | 4.6 |
| polyamine | DETA | TETA | TEPA | PEHA | IPD | HMDA |
| pot life in hours | 1–1.5 | 1–1.5 | 1–1.2 | 1 | 0.5–0.75 | 0.5–1 |
| Shore A after | | | | | | |
| 1 day | 11 | 18 | 30 | 38 | 30 | 31 |
| 3 days | 14 | 25 | 37 | 42 | 34 | 40 |
| 7 days | 17 | 27 | 39 | 47 | 38 | 45 |

Example 5

547 parts by weight of a NCO prepolymer comprising 222 parts by weight of IPDI and 325 parts by weight of a polytetrahydrofurandiol (molecular weight 650) were reacted, according to Example 1, with 155 parts by weight of TAA in 702 parts by weight of DISFLAMOLL ® TKP. The reaction product had, at 25° C., a viscosity of 2,800 mPa·s and a free NCO content of 0.2 wt. %.

According to Example 1, the blocked prepolymer was reacted with the equivalent quantity of polyamine and cured at room temperature.

|  | Example | | | |
|---|---|---|---|---|
|  | 5.1 | 5.2 | 5.3 | 5.4 |
| polyamine | DETA | TETA | TEPA | PEHA |
| pot life in hours | 0.6 | 0.5 | 0.3 | 0.2 |
| Shore A after | | | | |
| 1 day | 12 | 25 | 30 | 34 |
| 3 days | 20 | 30 | 40 | 42 |
| 7 days | 25 | 30 | 38 | 46 |

Example 6

722 parts by weight of a NCO prepolymer comprising 222 parts by weight of IPDI and 500 parts by weight of a polytetrahydrofurandiol (molecular weight 1,000) were reacted, according to Example 1, with 155 parts by weight of TAA in 877 parts by weight of MESAMOLL ®. The reaction product had, at 25° C., a viscosity of 2,400 mPa·s and a free NCO content of 0.2 wt. %.

According to Example 1, the blocked prepolymer was reacted with the equivalent quantity of polyamine and cured at room temperature.

|  | Example | | | | |
|---|---|---|---|---|---|
|  | 6.1 | 6.2 | 6.3 | 6.4 | 6.5 |
| polyamine | DETA | TETA | TEPA | PEHA | TETA/HMDA 50:50 |
| pot life in hours | 0.5 | 0.5 | 0.3 | 0.2 | 0.4 |
| Shore A after | | | | | |
| 1 day | 10 | 26 | 31 | 33 | 25 |
| 3 days | 12 | 30 | 35 | 36 | 28 |
| 7 days | 14 | 26 | 37 | 40 | 34 |

Example 7

566 parts by weight of the trimeric hexamethylene diisocyanate (isocyanurate of hexamethylenediisocyanate) were reacted, according to Example 1, with 444 parts by weight of TAA in 1,000 parts by weight of DISFLAMOLL ® TKP. The reaction product had, at 25° C., a viscosity of 14,600 mPa·s and a free NCO content of 0.2 wt. %.

According to Example 1, the blocked HDI isocyanurate was reacted with the equivalent quantity of polyamine and cured at room temperature.

|  | Example | | | | | |
|---|---|---|---|---|---|---|
|  | 7.1 | 7.2 | 7.3 | 7.4 | 7.5 | 7.6 |
| polyamine | TMD | IPD | HMDA | LAROMIN ® C 260 | DETA | TDM/IPD 50:50 |
| pot life in hours | 0.25 | 1 | 1.25 | 1.3 | 0.5 | 0.5 |
| Shore A after | | | | | | |
| 1 day | 36 | 77 | 69 | 65 | 60 | 48 |
| 3 days | 35 | 83 | 72 | 67 | 64 | 52 |
| 7 days | 34 | 86 | 75 | 71 | 66 | 56 |

Example 8

205.1 parts by weight of the trimeric hexamethylene diisocyanate (isocyanurate of hexamethylenediisocyanate) were reacted, according to Example 1, with 157 parts by weight of 2,2,4,6-tetramethyl piperidine in 205.1 parts by weight of DISFLAMMOL ® TKP. The reaction product had, at 25° C., a viscosity of 25,500 mPa·s and a free NCO content of 0.3 wt. %.

According to Example 1, the blocked HDI isocyanurate was reacted with the equivalent quantity of polyamine and cured at room temperature.

|  | Example | | | | | |
|---|---|---|---|---|---|---|
|  | 8.1 | 8.2 | 8.3 | 8.4 | 8.5 | 8.6 |
| polyamine | IPD | HMDA | LAROMIN ® C 260 | DETA | TETA | PEHA |
| pot life in hours | 1–1.5 | 1–1.5 | 1–1.5 | 1 | 1 | 0.75–1 |
| Shore A after | | | | | | |
| 1 day | 76 | 78 | 67 | 59 | 70 | 70 |
| 3 days | 80 | 81 | 69 | 64 | 73 | 78 |
| 7 days | 83 | 84 | 74 | 67 | 78 | 85 |

Example 9

444 parts by weight of IPDI were heated with 1,000 parts by weight of a polytetrahydrofurandiol (molecular weight 1,000) in 1,839 parts by weight of MESAMOLL ® at 80° C. until the NCO content of the solution had reached 2.6 wt. %. Subsequently, the reaction mixture was reacted, according to Example 1, with 155 parts by weight of TAA and 240 parts by weight of sebacic acid ester of 4-hydroxy-2,2,6,6-tetramethyl piperidine. The reaction product had, at 25° C., a viscosity of 5,300 mPa·s and a free NCO content of 0.2 wt. %.

According to Example 1, the blocked IPDI prepolymer was reacted with the equivalent quantity of polyamine and cured at room temperature.

|  | Example | | | |
|---|---|---|---|---|
|  | 9.1 | 9.2 | 9.3 | 9.4 |
| polyamine | DETA | TETA | TEPA | PEHA |
| pot life in hours | 0.25 | 0.25 | 0.3 | 0.2 |
| Shore A after | | | | |
| 1 day | 5 | 19 | 23 | 27 |
| 3 days | 7 | 22 | 27 | 32 |
| 7 days | 10 | 24 | 29 | 38 |

Example 10

444 parts by weight of IPDI were heated with 1,000 parts by weight of an OH group-containing polyester, comprising adipic acid, 1,6-hexanediol and NPG having a molecular weight of 1,000 in 1,226 parts by weight of MESAMOLL ® at 80° C. until the NCO content of the solution had reached 2.6%. Subsequently the reaction mixture was reacted, according to Example 1, with 155 parts by weight of TAA and 240 parts by weight of sebacic acid ester of 4-hydroxy-2,2,6,6-tetramethyl-piperidine. The reaction product had, at 25° C., a viscosity of 14,300 mPa·s and a free NCO content of 0.2 wt. %.

According to Example 1, the blocked IPDI prepolymer was reacted with the equivalent quantity of polyamine and cured at room temperature.

|  | Example | | | |
|---|---|---|---|---|
|  | 10.1 | 10.2 | 10.3 | 10.4 |
| polyamine | DETA | TETA | DETA/IPD 50:50 | DETA/HMDA 50:50 |
| pot life in hours | 0.15 | 0.1 | 0.2 | 0.2 |
| Shore A after | | | | |
| 1 day | 16 | 24 | 18 | 21 |
| 3 days | 18 | 26 | 21 | 25 |
| 7 days | 21 | 29 | 24 | 30 |

Example 11

547 parts by weight of a NCO prepolymer comprising 222 parts by weight of IPDI and 325 parts by weight of a polytetrahydrofurandiol (molecular weight 650) were reacted, according to Example 1, with 240 parts by weight of sebacic acid ester of 4-hydroxy-2,2,6,6-tetramethylpiperidine in 787 parts by weight of DISFLAMOLL ® TOF. The reaction product had, at 25° C., a viscosity of 5,600 mPa·s and a free NCO content of 0.2 wt. %.

According to Example 1, the blocked IPDI prepolymer was reacted with the equivalent quantity of polyamine and cured at room temperature.

|  | Example | | | |
|---|---|---|---|---|
|  | 11.1 | 11.2 | 11.3 | 11.4 |
| polyamine | DETA | TETA | DETA/IPD 50:50 | DETA/LAROMIN ® C 260 50:50 |
| pot life in hours | 0.75 | 0.5 | 0.5 | 0.25 |
| Shore A after | | | | |
| 1 day | 35 | 38 | 37 | 41 |
| 3 days | 40 | 42 | 41 | 44 |
| 7 days | 41 | 44 | 43 | 49 |

Example 12

1,222 parts by weight of the prepolymer from Example 2 were reacted, according to Example 1, with 240 parts by weight of sebacic acid ester of 4-hydroxy-2,2,6,6-tetramethyl piperidine in 365.5 parts by weight of DISFLAMOLL ® TOF. The reaction product had, at 25° C., a viscosity of 7,400 mPa·s and a free NCO content of 0.2 wt. %.

According to Example 1, the blocked IPDI prepolymer was reacted with the equivalent quantity of polyamine and cured at room temperature.

|  | 12.1 | 12.2 | 12.3 | 12.4 | 12.5 |
|---|---|---|---|---|---|
| polyamine | DETA | TETA | TEPA | PEHA/HMDA 50:50 | TETA/IPD 50:50 |
| pot life in hours | 2 | 1 | 0.5 | 2 | 2 |
| Shore A after | | | | | |
| 1 day | 19 | 23 | 30 | 19 | 17 |
| 3 days | 21 | 26 | 34 | 21 | 24 |
| 7 day | 24 | 28 | 34 | 23 | 24 |

B One-component systems

The added bis-ketimes were synthesized according to known methods from polyamine and ketone using an entraining agent and p-toluene sulfonic acid as the water separator. Upon obtaining the calculated quantity of water, the entraining agent was removed by distillation and the corresponding bis-ketimine was distilled in a vacuum.

Example 1

(a) 1,332 parts by weight of IPDI were heated with 134 parts by weight of trimethylolpropane in 1,907 parts by weight of DISFLAMOLL® TKP at 80° C. until the NCO content of the solution had reached 11.2%. Subsequently, the reaction mixture was reacted, according to Example 1, with 1,395 parts by weight of TAA. The reaction product had, at 25° C., a viscosity of 21,500 mPa·s and a free NCO content of 0.3 wt. %.

(b) 50 wt. % of the blocked prepolymer, according to Example B 1a, and 50 wt. % of the blocked prepolymer, according to Example A 2, were homogenized with the equivalent quantity of MIBK-IPD-bis-ketimine and applied an concrete slabs. Curing took place at room temperature. After 24 hours of curing, the surface was tack-free and after seven days the coating had cured completely.

Example 2

50 wt. % of the blocked prepolymer, according to Example B 1a, and 50 wt. % of the blocked prepolymer, according to Example A 1, were homogenized with the equivalent quantity of bis-ketimine, according to B 1b, and applied on concrete slabs. After 24 hours of curing, the surface was tack-free and after seven days the coating had cured completely.

Example 3

50 wt. % of the blocked prepolymer, according to Example B 1a, and 50 wt. % of the blocked prepolymer, according to Example A 5, were homogenized with the equivalent quantity of bis-ketimine, according to B 1b, and applied on concrete slabs. After 24 hours of curing, the surface was tack-free and after seven days the coating had cured completely.

Example 4

(a) 731 parts by weight of IPDI-uretedione were dissolved in 800 parts by weight of MESAMOLL® and subsequently reacted, according to Example 1, with 469 parts by weight of TAA. The reaction product had, at 25° C., a viscosity of 18,000 mP·s and a free NCO content of 0.3 wt. %.

(b) 50 wt. % of the blocked IPDI-uretedione, according to Example 4a, and 50 wt. % of the blocked prepolymer, according to Example A 2 were homogenized with the equivalent quantity of bis-ketimine, according to Example B 1b, and applied on concrete slabs. After 24 hours of curing at room temperature, the surface was tack-free and after seven days the coating had cured completely.

Example 5

50 wt. % of the blocked IPDI-uretedione, according to Example B 4a, and 50 wt. % of the blocked prepolymer, according to Example A 6, were homogenized with the equivalent quantity of bis-ketimine, according to Example B 1b, and applied on concrete slabs. After 24 hours of curing at room temperature, the surface was tack-free and after seven days the coating had cured completely.

Example 6

50 wt. % of the blocked IPDI-uretedione, according to Example B 4a, and 50 wt. % of the blocked prepolymer, according to Example A 6, were homogenized with the equivalent quantity of bis-ketimine, prepared from TDM and MIBK, and applied on concrete slabs. After 24 hours of curing at room temperature, the surface was tack-free and after seven days the coating had cured completely.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A cold-curing, solvent-free, duroplastic two- or one-component polyurethane-polyurea compound, comprising:

(a) a (cyclo) aliphatic polyisocyanate, having NCO groups blocked with piperidine derivatives of the following formula:

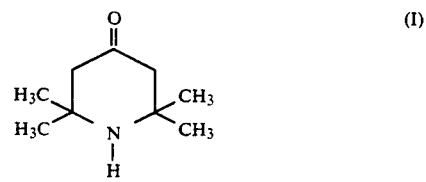

or

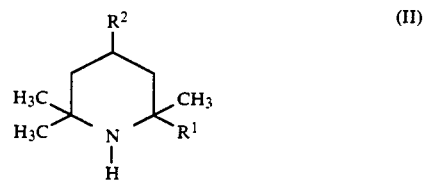

wherein:

$R^1 = H, CH_3$

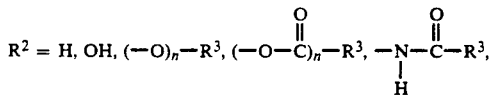

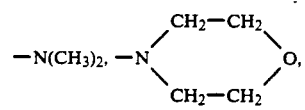

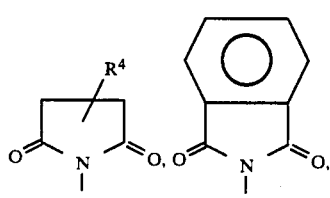

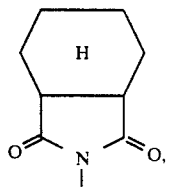

n = 1 or 2

$R^3$ = a $C_{1-18}$ alkyl group, if n = 1 and $R^3$ = a $C_{2-18}$ alkylene group, if n = 2

$R^4$ = H, or a $C_{1-20}$ alkyl group, and wherein $(-O)_2-R^3$ is a group in which the two oxygen atoms are singly bonded to the carbon atom to which $R^2$ is bonded and $R^3$ forms an alkylene bridge between said two oxygen atoms, and $(-O-C=O)_2-R^3$ is a group in which the two oxygen atoms are singly bonded to the carbon atom to which $R^2$ is bonded and $R^3$ forms an alkylene bridge between the two carbonyl carbon atoms, and (b) a primary or secondary di- or polyamine wherein in the case of one-component system, the primary amino groups are present in a blocked form as ketimines and (c) a polyester polyol or a polyether polyol.

2. The compound of claim 1, wherein said blocked (cyclo)aliphatic diisocyanate is chain-lengthened with a polyol, wherein the OH/NCO ratio is 1:1 to 1:1.2.

3. The compound of claim 2, wherein said OH/NCO ratio is 1:1.

4. The compound of claim 1, wherein said blocked (cyclo)aliphatic polyisocyanate exists as a dimer or trimer.

5. The compound of claim 4, wherein said dimer or trimer is in mixture with a monomeric diisocyanate.

6. The compound of claim 1, wherein the NCO/H-N< ratio ranges from 0.8 to 1.4.

7. The compound of claim 6, wherein said NCO/H-N< ratio ranges from 0.9 to 1.1.

8. The compound of claim 7, wherein said NCO/H-N< ratio is about 1.

9. The compound of claim 1, wherein said polyisocyanate is selected from the group consisting of IPDI, TMDI, and HDI.

10. The compound of claim 1, wherein aliphatic, cycloaliphatic or aliphatic/cycloaliphatic di- and/or polyamines are added as component (b).

11. The compound of claim 1, wherein component (b) is selected from the group consisting of IPD, TMD, DA51, HMDA, DETA, TETA, TEPA and PEHA.

12. The compound of claim 1, wherein the isocyanate/amino groups ratio is 1:1.

13. The compound of claim 1, further comprising an ingredient selected from the group consisting of a filler, a pigment, a catalyst and a viscosity controller.

14. A method for coating, sealing or encapsulating a substrate, comprising:
coating a substrate with a composition comprising:
(a) a (cyclo)aliphatic polyisocyanate, having NCO groups blocked with piperidine derivatives of the following formula:

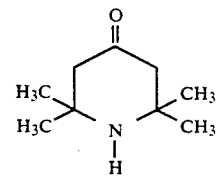

or

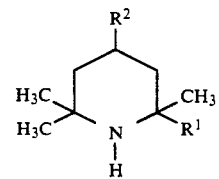

wherein:

$R^1$ = H, $CH_3$

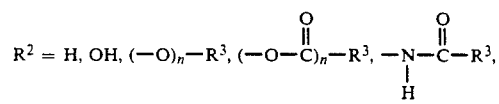

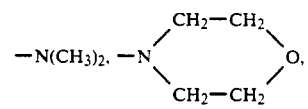

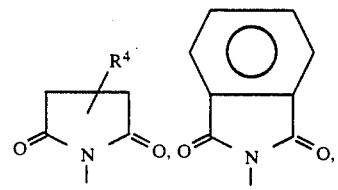

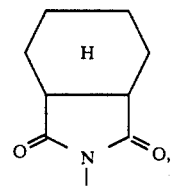

n = 1 or 2

$R^3$ = a $C_{1-18}$ alkyl group, if n = 1 and $R^3$ = a $C_{2-18}$ alkylene group, if n = 2

$R^4$ = H, or a $C_{1-20}$ alkyl group, and wherein $(-O)_2-R^3$ is a group in which the two oxygen atoms are singly bonded to the carbon atom to which $R^2$ is bonded and $R^3$ forms an alkylene bridge between said two oxygen atoms, and $(-O-C=O)_2-R^3$ is a group in which the two oxygen atoms are singly bonded to the carbon atom to which $R^2$ is bonded and $R^3$ forms an alkylene bridge between the two carbonyl carbon atoms, and (b) a primary or secondary di- or polyamine wherein in the case of one-component system, the primary amino groups are present in a blocked form as ketimines and (c) a polyester polyol or a polyether polyol.

15. An article, comprising a substrate which is coated, sealed, or encapsulated by a composition, comprising (a) a (cyclo)aliphatic polyisocyanate, having NCO groups blocked with piperidine derivatives of the following formula:

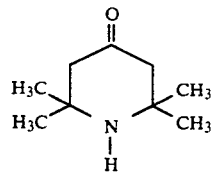 (I)

or

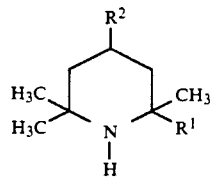 (II)

wherein:
$R^1 = H, CH_3$

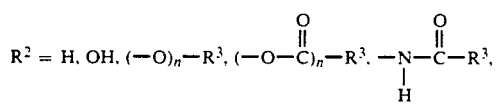

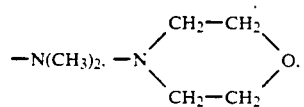

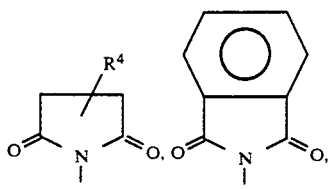

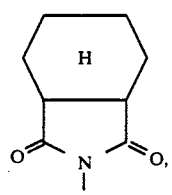

$n = 1$ or 2
$R^3 =$ a $C_{1-18}$ alkyl group, if $n = 1$ and
$R^3 =$ a $C_{2-18}$ alkylene group, if $n = 2$
$R^4 = H$, or a $C_{1-20}$ alkyl group, and
wherein $(-O)_2-R^3$ is a group in which the two oxygen atoms are singly bonded to the carbon atom to which $R^2$ is bonded and $R^3$ forms an alkylene bridge between said two oxygen atoms, and $(-O-C=O)_2-R^3$ is a group in which the two oxygen atoms are singly bonded to the carbon atom to which $R^2$ is bonded and $R^3$ forms an alkylene bridge between the two carbonyl carbon atoms, and (b) a primary or secondary di- or polyamine wherein in the case of one-component system, the primary amino groups are present in a blocked form as ketimines and (c) a polyester polyol or a polyether polyol.

* * * * *